United States Patent Office 2,700,635
Patented Jan. 25, 1955

2,700,635

EXTRACTION OF AQUEOUS SOLUTIONS OF VITAMIN $B_{12}$ MATERIALS WITH HALOHYDRIN SOLVENTS

Allen Spencer Phelps, Orangeburg, N. Y., Siegfried A. Muller, Westwood, N. J., and Jerry Robert D. McCormick, New City, N. Y., assignors to American Cyanamid Company, New York, N. Y., a corporation of Maine No Drawing. Application February 23, 1952,
Serial No. 273,153

5 Claims. (Cl. 167—81)

This invention relates to the recovery and purification of vitamin materials from aqueous solutions of the same; and, more particularly, to the recovery of vitamin materials from aqueous solutions of the same by liquid-liquid extraction with halohydrin solvents.

It is now well established that various vitamin B12 materials, for instance vitamin B12 and vitamin B12b, have utility in the treatment of certain dietary deficiencies. It is also well known that there are many suitable sources from which such vitamin materials can be recovered. Such materials were first obtained from liver concentrates and such concentrates still remain a satisfactory source from which vitamin B12 materials can be obtained. However, a more suitable source has been found to be fermentation liquors which have supported the growth of various microorganisms, such as *Streptomyces olivaceus*, *Streptomyces aureofaciens*, *Streptomyces rimosus* and *Ermothecium ashbyii*. In addition, many other sources have recently been discovered, such as sewerage sludge. Treatment of such sources for the recovery of vitamin B12 material generally results in the recovery of a mixture. This is because vitamin B12 materials, such as vitamin B12 and vitamin B12b, are so physically and chemically similar that a method suitable for the recovery of one is generally suitable for the recovery of all. Therefore, in this specification and claims, no distinction will be made between the various related compounds having vitamin B12 activity and all will be referred to collectively as "vitamin B12 material."

Vitamin B12 materials are water-soluble and, in fact, a usual source of the same is an aqueous solution, such as one of the above-mentioned fermentation liquors. Even if the desired source is a solid, it is quite frequently convenient to prepare an aqueous solution of the vitamin B12 material. Since, however, vitamin B12 usually occurs in the presence of large amounts of other water-soluble materials, the problem of separating the small amount of desired vitamins from the large amount of undesirable water-soluble impurities is a difficult task. One method which has been employed to a small extent to separate or recover the vitamin B12 material comprises treating an aqueous solution of said material with a selective solvent. Such a method would have many advantages if suitable selective solvents were readily available, but before a solvent can be considered to be satisfactory for this purpose, it must have a combination of qualities rarely found in a single substance. For instance, the solvent must either be water-immiscible or brine-immiscible; the solvent must have a high selectivity or, in other words, it must be an excellent solvent for the B12 material, but only a poor solvent for the impurities usually associated with the vitamin B12 material; and the solvent must have a high distribution coefficient for vitamin B12 material with regard to water. By a high distribution coefficient is meant that when an aqueous solution of vitamin B12 material is in equilibrium with said solvent, the concentration of vitamin material in the organic phase will be high with respect to the concentration of vitamin B12 material in the aqueous phase. Since the known solvents for vitamin B12 material did not possess, to the desired extent, the above combination of qualities, the use of such solvents has resulted in a poor recovery of relatively impure material. For this reason, prior to the present invention, such procedures have received only limited use. The new process of this invention overcomes the above difficulties by employing a solvent with the above combination of desirable qualities.

According to the new process of this invention, an aqueous solution of vitamin B12 material is brought into interfacial contact with a halohydrin solvent selected from the group consisting of bromohydrins and chlorohydrins having from 3 to 4 carbon atoms inclusive, having only one hydroxy group and having a hydroxy-substituted carbon atom adjacent to a halogen-substituted carbon atom. Halohydrins of this class may be illustrated by the following specific examples: 1-chloro-2-propanol, 2-chloro-1-propanol or commercial mixtures of the 1,2-propylene chlorohydrins; 1-bromo-2-propanol, 2-chloro-1-butanol, 3-chloro-2-butanol, alpha-glycerol dichlorohydrin and beta-glycerol dichlorohydrin. The above specific examples are for purposes of illustration only and other bromohydrins or chlorohydrins having 3–4 carbon atoms, having only 1 hydroxy group and having a halogen-substituted carbon atom adjacent to a hydroxy-substituted carbon atom, are satisfactory.

The new process of this invention may be satisfactorily employed to extract vitamin B12 material from practically any aqueous solution of the same ordinarily encountered in the purification or recovery of vitamin B12 materials. The new process is of value in extracting vitamin B12 material from various fermentation "beers" which are obtained as a result of antibiotic production. These liquors may be extracted by the new process of this invention before the antibiotic material is removed or the liquors may be treated in various manners to remove the antibiotic material before they are extracted to recover the vitamin B12 material. Such liquors may also be given other physical or chemical treatments before extraction, such as treatments to increase the proportion of vitamin B12 or to break up vitamin B12-protein conjugates. There are many other instances where the new process of this invention can be employed to recover vitamin B12 material or to purify a concentrate of the same. For instance, in other procedures of vitamin B12 purification, it is quite common to form aqueous solutions of partially purified vitamin B12 materials at one stage, or another, of the procedure, and the new process of this invention can be employed to extract these aqueous solutions. In other words, the new process of this invention can be employed as the sole means of purification and recovery, or it can be employed in combination with other purification procedures. Other examples of aqueous solutions of vitamin B12 material which can be treated according to the procedure of this invention include wash waters obtained from washing aureomycin cakes or streptomycin cakes and aqueous extracts of liver cakes. In other words, the new process of this invention can be employed to recover vitamin B12 material from any aqueous solution of the same ordinarily encountered in vitamin B12 purification.

A liquid-liquid extraction procedure for recovering vitamin B12 material has several advantages over a solid-liquid extraction procedure. One such advantage is due to the fact that most of the impurities (or many of the impurities) encountered in vitamin B12 purification are also water-soluble. Therefore, by liquid-liquid extraction of an aqueous solution of impure vitamin B12 material with a solvent having a high distribution coefficient with regard to water, a much greater degree of purification can be obtained than can be obtained with simple extraction of a solid source of vitamin B12 material. A further advantage of liquid-liquid extraction is that it is generally possible to employ a smaller quantity of organic solvent and, as organic solvents are expensive, this results in a considerable reduction in cost. However, as mentioned above, a solvent must have, in order to be suitable for liquid-liquid extraction, several qualities which need not be possessed by a solvent which is suitable for solid-liquid extraction. These qualities include a high distribution coefficient for vitamin B12 material with regard to water and also the quality of being water-immiscible or brine-immiscible. For this reason, solvents which are suitable for solid-liquid extraction are not always suitable for liquid-liquid extraction. It has been found that many of the halohydrin solvents, including some that are not suitable for liquid-liquid extraction, can also be employed in solid-liquid extraction; but this constitutes the subject matter of my copending application, Serial No. 273,151, filed concurrently herewith.

The new process of this invention has many advantages over prior art procedures. For instance, the halohydrin solvents are highly selective and, therefore, result in a high degree of purification with a minimum number of operations. The halohydrin solvents of this invention are also possessed of a high distribution coefficient for vitamin B12 material with regard to water and this also results in a high degree of recovery and purification. And since the new process employs liquid-liquid extraction, simple apparatus can be employed with highly satisfactory results. These advantages make possible a simple and efficient process which can be employed with a minimum of equipment.

The new halohydrin solvents of this invention can be employed as the sole solvent or they can be employed in combination with other solvents for B12 materials. In most instances, it will be found to be advantageous to employ the halohydrins alone but in some instances, for instance when the halohydrin is somewhat water-soluble, it may be found advantageous to employ a second solvent in combination with the halohydrin. Solvents suitable for this purpose may be illustrated by chloroform and butanol. The use of such an auxiliary solvent reduces the water-solubility of the halohydrin and results in an improved efficiency of the process. In some instances, it may be desirable to further decrease the solubility of the halohydrin solvent in the aqueous solution by the addition to the aqueous solution of an inorganic salt such as sodium chloride.

The new method of this invention comprises simply bringing the aqueous solution of vitamin B12 material into interfacial contact with the halohydrin solvent. Such interfacial contact may be accomplished by any liquid-liquid extraction procedure. For instance, in small-scale operation, it will usually be found advantageous to employ a batch procedure in which the aqueous solution of vitamin material is simply dispersed in the organic solvent, or vice versa. The two immiscible liquids can then be separated by any of the known procedures such as decantation or centrifugation. Once the organic phase has been separated from the aqueous phase, the vitamin B12 material is recovered from the organic solution of the same by known procedures which will be discussed in detail in subsequent paragraphs. In larger-scale operation, a more complicated procedure for obtaining interfacial contact is usually advantageous. For instance, on pilot-plant scale or commercial scale, countercurrent extraction will be found to be an excellent procedure for obtaining a good yield or recovery of the vitamin B12 material. For performing this countercurrent extraction, any of the known types of extraction apparatus, such as baffle towers, packed towers, or horizontal troughs, may be employed.

Some of the halohydrin solvents covered by the new process of this invention are water-soluble to some extent and when employing one of these solvents, steps must be taken to decrease the solubility of the halohydrin in the aqueous solvent so that two phases are obtained. This may be accomplished by one of several methods. For instance, the halohydrin solvent may be employed in combination with an auxiliary solvent, such as outlined above; however, a more convenient and economical procedure comprises adding a salt to the aqueous solution of vitamin B12 material to decrease the solubility of the halohydrin therein. The halohydrins have a higher distribution coefficient for vitamin B12 material with regard to some salt brines than to others and, therefore, if a salt is to be employed, more advantageous results can be obtained by employing a salt which gives a brine with regard to which the halohydrins have a high distribution coefficient. In fact, because of this quality possessed by some brine solutions, it is often advantageous to employ a salt, even in combination with a halohydrin solvent which is not water-soluble. Salts which are known to increase the effectiveness of the halohydrins in extracting vitamin B12 material from aqueous solutions include sodium chloride, ammonium sulfate and potassium carbonate. On the other hand, the effectiveness of the halohydrin solvents in extracting vitamin B12 materials from an aqueous solution is decreased by the addition of calcium chloride.

The concentration of vitamin B12 material in the aqueous solution to be treated may vary within wide limits. For instance, when the aqueous solution is a partially purified concentrate, the aqueous solution may contain as high as 500 gammas or may even be entirely saturated with vitamin B12 material. However, this is usually not advantageous as a greater degree of purification is obtained if the concentration is below about 200 gammas of vitamin B12 activity per milliliter. On the other hand, the aqueous solution to be treated may be a very dilute solution. The minimum concentration of vitamin B12 material in the aqueous solution, of course, depends on the overall efficiency of the process, but satisfactory recoveries can usually be obtained from aqueous solutions as dilute as about 0.05 gamma of vitamin B12 activity per milliliter and in some instances, under very favorable conditions, as low as 0.005 gamma per milliliter. However, more satisfactory results are usually obtained if the concentration of vitamin B12 material is above about 0.1 gamma of vitamin B12 activity per milliliter. As will be obvious to those skilled in the art, this wide range of operability makes the new process of this invention suitable for the extraction of practically any aqueous solution of vitamin B12 material ordinarily encountered in B12 purification procedures.

The optimum amount of halohydrin solvent to be employed depends upon a number of variables. For instance, if the halohydrin is water-soluble to some extent, the halohydrin must be employed in an excess of the solubility thereof in the particular aqueous solution to be extracted so that two phases will actually be obtained. Another factor to be considered is the distribution coefficient of the particular halohydrin solvent for vitamin B12 material with regard to water. If the halohydrin has an exceptionally high distribution coefficient, a smaller quantity of solvent need be employed for a reasonably complete recovery than would be necessary if the halohydrin had a lower distribution coefficient. Other factors which would be taken into consideration include the concentration of vitamin B12 material in the aqueous solution and the degree of recovery desired. As a general rule, a volume of halohydrin solvent equal to about .01 to 100 times the volume of the aqueous solution to be extracted, depending upon the above factors, will be found to be most advantageous.

The time required for extraction is also dependent upon a number of variables. For instance, if a high degree of interfacial contact is obtained, a shorter time will be required for reasonably complete extraction than will be required if only a poor degree of interfacial contact is obtained. Other factors which should be considered include the degree of recovery desired, the distribution coefficient for vitamin B12 material with regard to water of the particular halohydrin solvent employed and solubility of vitamin B12 material in the particular halohydrin solvent. Under favorable conditions, only a few minutes of contact is all that is required.

It is an advantage of the new process of this invention that it can be performed over a wide temperature range. For instance, the new process can be performed quite readily at room temperature, which eliminates the necessity of heating or cooling apparatus. On the other hand, if desired, the new process can usually be operated at a temperature as low as the freezing point of the aqueous solution or, in other words, about 0° C. The new process of this invention should not be performed at temperatures above about 80–100° C. because of the increasing instability of vitamin B12 materials at higher temperatures. In fact, more satisfactory results are usually obtained if the temperature is maintained below about 60° C. Temperatures in the range of 15–30° C. are preferred.

It is also an advantage of the new process of this invention that a vitamin B12 aqueous solution of practically any pH can be extracted. Of course, vitamin B12 materials are usually relatively instable in aqueous solutions at pH's below about 1.0 and at pH's above about 11 or 12 and, therefore, hydrogen in concentrations within this range should be employed. A second reason why extractions should not be made at pH's above about 11 or 12 is that the halohydrins are also unstable at the higher pH's. However, at any pH within the above range, satisfactory extractions can be made and, as will be obvious to those skilled in the art, this means that careful pH control is usually, if not always, unnecessary. However, if desired, improved results can usually be obtained by some measure of pH control. The halohydrin solvents are more specific in extracting vitamin B12 materials from aqueous solutions having a hydrogen ion concentration in the range of pH 7–10, although the distribution coefficient of the halohydrins for vitamin B12 materials with regard to water is higher if the aqueous phase has a hydrogen ion concentration in the range of about pH 1–4. This means that if one is interested in obtaining a high degree of purification, a pH in the upper range should be employed. On the other hand, if one is primarily interested in the greatest degree of recovery, a pH in the lower part of the operable range should be employed. A highly satisfactory procedure has been found to be to extract at a relatively high pH when the concentration of impurities is high, even if this necessitates the use of successive extractions; and once a purified aqueous solution has been obtained, the pH can be lowered to where a greater degree of recovery per extraction is obtained. This results in a maximum degree of purification, along with a maximum recovery of vitamin B12 materials.

After the desired degree of interfacial contact has been obtained, the vitamin B12 material can be recovered from the resulting halohydrin solution by any of several known procedures for recovering materials from solution. For instance, a satisfactory recovery can usually be made by simply removing the halohydrin solvent by vacuum distillation. A preferred method of recovery comprises diluting the halohydrin solution with a second water immiscible organic liquid which is fully miscible with the halohydrin solvent, but which has practically no solvent power for the vitamin B12 materials. This mixture of solvent and nonsolvent can then be water-extracted to effect recovery of the vitamin B12 material as a purified aqueous solution. Examples of suitable organic liquids which are nonsolvents for the vitamin B12 material, but which are miscible with the halohydrin, may be illustrated by the following: benzene, ether, chloroform, higher petroleum ethers and acetone. A volume of the second organic liquid equal to about 4 to 12 times the volume of the halohydrin solution is usually advantageous.

The new process of this invention will be more particularly illustrated by the following specific examples, in which all parts are by weight, unless otherwise illustrated.

*Example 1*

To 1 liter of an aqueous solution of vitamin B12 material, having a solids content of about 30 grams and a concentration of vitamin B12 material of about 10 gammas of B12 activity per gram of total solids, there was added approximately 130 grams of sodium chloride. The resulting brine was extracted with five 100-milliliter portions of a commercial mixture of 1,2-propylene chlorohydrins and the combined extracts were concentrated in vacuo to approximately 76 milliliters. The resulting concentrate was filtered to remove inactive solids and the filtrate was found by assay to contain 3.5 gammas of vitamin B12 activity per milliliter. The vitamin B12 activity was recovered from the propylene chlorohydrin solution by dilution with approximately 10 volumes of benzene followed by extraction with one volume of water and the thus recovered vitamin B12 material was found to have a dry basis potency of 700 gammas of vitamin B12 activity per gram of total solids. In other words, by a single purification step, a more than 70 fold purification was obtained.

In place of the mixture of propylene chlorohydrins employed in this example, 1-chloro-2-propanol and 2-chloro-1-propanol can be employed individually. Other methods of recovery, for instance solvent evaporation in vacuo, can also be employed with satisfactory results.

*Example 2*

Two parts by volume of a pink-colored vitamin B12 solution containing about 15% sodium chloride was shaken with 2 parts by volume of a mixture of glycerol dichlorohydrins (75% alpha,beta; 25% alpha,gamma glycerol dichlorohydrin). The organic phase was separated from the aqueous phase by centrifuging and assayed. The organic phase was found to contain 7000 gammas of B12 activity per liter and the aqueous phase was found to contain only 70 gammas of B12 activity per liter. Recovery of the thus purified vitamin B12 material is accomplished by dilution with 10 volumes of benzene and extraction with one volume of water.

In place of the mixture of glycerol dichlorohydrins employed in this example, one can employ, with equally satisfactory results, the dichlorohydrins individually. Satisfactory results can also be obtained by substituting equal quantities of other halohydrins for the mixture of glycerol dichlorohydrins employed in the above example. For instance, 1-bromo-2-propanol, 2-chloro-1-butanol and 3-chloro-2-butanol can be employed quite satisfactorily.

*Example 3*

To 750 parts by volume of a crude solution of vitamin B12 material, assaying about 27 gammas of activity per milliliter, there was added 115 milliliters of a mixture of glycerol dichlorohydrins and the resulting mixture thoroughly stirred. The pH of the mixture was then adjusted to about pH 2 and the resulting mixture centrifuged to separate the two phases. A second extraction with 75 parts per volume of glycerol dichlorohydrin solvent was performed and the two extracts combined. The total volume of combined extracts measured 180 milliliters and assayed 106 gammas of vitamin B12 activity per milliliter.

We claim:

1. A method of recovering vitamin B12 in a purified form from aqueous solutions containing vitamin B12 and associated impurities which comprises bringing into interfacial contact therewith a halohydrin having selective solvent properties for vitamin B12 and being immiscible in the said aqueous solution, said halohydrin being selected from the group consisting of chlorohydrins and bromohydrins having from 3 to 4 carbon atoms inclusive, having only one hydroxy group and having a hydroxy substituted carbon atom adjacent to a halogen substituted carbon atom and after interfacial contact with said aqueous solution separating therefrom the halodrin solvent phase and recovering vitamin B12 from said halohydrin solution in a concentrated and purified form.

2. The method of claim 1 in which a water soluble inorganic salt is added to the aqueous solution to depress the solubility of the halohydrin solvent therein.

3. A method of recovering vitamin B12 in purified form from aqueous solutions containing vitamin B12 and associated impurities which comprises bringing into interfacial contact therewith 1-chloro-2-propanol and after interfacial contact with said aqueous solution separating therefrom the 1-chloro-2-propanol phase and recovering vitamin B12 from said halohydrin solution in a concentrated and purified form.

4. A method of recovering vitamin B12 in purified form from aqueous solutions containing vitamin B12 and associated impurities which comprises bringing into interfacial contact therewith an alpha, beta, glycerol dichlorohydrin and after interfacial contact with said aqueous solution separating therefrom the alpha, beta, glycerol dichlorohydrin phase and recovering vitamin B12 from said halohydrin solution in a concentrated and purified form.

5. A method of recovering vitamin B12 in purified form from aqueous solutions containing vitamin B12 and associated impurities which comprises bringing into interfacial contact therewith a mixed halohydrin solvent solution consisting primarily of 1-chloro-2-propanol and 2-chloro-1-propanol and after interfacial contact with said aqueous solution separating therefrom the halohydrin solvent phase and recovering vitamin B12 from said halohydrin solution in a concentrated and purified form.

References Cited in the file of this patent

UNITED STATES PATENTS

| | | |
|---|---|---|
| 2,582,589 | Fricke | Jan. 15, 1952 |
| 2,595,159 | Meyer | Apr. 29, 1952 |
| 2,652,357 | Ford | Sept. 15, 1953 |

OTHER REFERENCES

Merck Index, 5th edition (1940), pages 224, 457.

Zucker: Vitamins and Hormones, vol. VIII (1950), pp. 8 and 9.

Jackson: Journal of the American Chemical Society, vol. 73, January 1951, pp. 337 to 341.